United States Patent
Gugwad et al.

(10) Patent No.: US 11,323,296 B1
(45) Date of Patent: May 3, 2022

(54) DECISION FEEDBACK EQUALIZATION TRAINING SCHEME FOR GDDR APPLICATIONS

(71) Applicant: CADENCE DESIGN SYSTEMS, INC., San Jose, CA (US)

(72) Inventors: Sachin Ramesh Gugwad, Bangalore (IN); Hari Anand Ravi, Bangalore (IN); Thomas E Wilson, Laurel, MD (US); Vinod Kumar, Pratapgarh (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 95 days.

(21) Appl. No.: 16/943,535

(22) Filed: Jul. 30, 2020

(51) Int. Cl.
*H04L 25/03* (2006.01)
*H04L 27/01* (2006.01)

(52) U.S. Cl.
CPC .. *H04L 25/03057* (2013.01); *H04L 25/03146* (2013.01); *H04L 25/03343* (2013.01); *H04L 25/03885* (2013.01); *H04L 27/01* (2013.01); *H04L 2025/0349* (2013.01)

(58) Field of Classification Search
CPC ......... H04L 25/03057; H04L 25/03146; H04L 25/03343; H04L 43/16; H04L 25/03885

USPC ........................................................ 375/233
See application file for complete search history.

(56) References Cited

U.S. PATENT DOCUMENTS

| | | | |
|---|---|---|---|
| 2011/0274215 A1* | 11/2011 | Hollis | H04L 7/0054 375/317 |
| 2016/0179616 A1* | 6/2016 | Ha | G11C 29/028 714/755 |

* cited by examiner

*Primary Examiner* — Leila Malek
(74) *Attorney, Agent, or Firm* — Foley & Lardner LLP (57) ABSTRACT

The embodiments described herein provide for a method and system for training an optimal decision feedback equalization (DFE) coefficient for use in GDDR and DDR applications. The method includes determining a first expected bit pattern using a reference voltage. The method further includes determining a transition voltage value of the first expected bit pattern. The method further includes receiving a second expected bit pattern having a same first bit as the first expected bit pattern. The method further includes determining a transition voltage value of the second expected bit pattern using the reference voltage. The method further includes calculating an optimal reference voltage value by averaging the transition voltage values of the first expected bit pattern and the second-expected bit pattern and storing the optimal reference voltage value in a register corresponding to a logic value of the same first bit.

20 Claims, 7 Drawing Sheets

DECISION FEEDBACK EQUALIZATION TRAINING SCHEME FOR GDDR APPLICATIONS

TECHNICAL FIELD

The present invention relates generally to the field of high-speed memory interface receivers. More specifically, the present invention relates generally to training schemes for decision feedback equalization in high-speed memory interface receivers.

BACKGROUND

High-speed memory system receivers, such as those using graphics double data rate (GDDR) or double data rate (DDR) memory systems, use Decision Feedback Equalization (DFE) to reduce timing and voltage noise margins lost due to package or printed circuit board (PCB) transmission losses. Some unique requirements exist for memory systems. For example, memory systems often use many parallel signals, and must be area and power efficient. Data traffic in operation is often unpredictable and thus unsuitable for continuous adaptation of DFE coefficients as used in, for example, Peripheral Component Interconnect Express (PCIe) systems. Therefore, such systems require training of DFE coefficients at startup, with training completed quickly to minimize downtime. Further, memory systems use single-ended signaling instead of differential, so optimal signal level detection is critical to detect all incoming data patterns properly.

SUMMARY

Described herein are systems and methods addressing shortcomings in the prior art and may provide additional or alternative benefits over conventional approaches. Conventional approaches require DFE coefficients to be continuously trained, which can favor identifying a transition inaccurately if coefficient changes with higher step size because continuously adjusting the DFE coefficients could ultimately decrease or increase a reference voltage to a point where any change in voltage of an incoming signal will be considered to be a transition from "logic high" (e.g., 1) to "logic low" (e.g., 0), even if there was no such transition. Embodiments described herein train DFE coefficients at startup to determine an optimal reference voltage. By training at startup, when only a relatively few number of bits of a specific training signal have been received, an optimal reference signal is established to compare against later signals, such that the optimal reference signal need not be adjusted and thus will not be susceptible to deception. Training at startup, however, should be done quickly to reduce downtime. To provide this desired operational speed, embodiments described herein contemplate a memory system that include a reference bit-stream receiver and an error receiver, which work together to determine a bit pattern to use for training, from an incoming signal (e.g., training signal), the DFE coefficients representing the optimal reference voltage.

Embodiments described herein also reduce chip size by being generally more area efficient. This is achieved by reusing the reference bit-stream receiver and error receiver, after training is complete, to receive signals containing data from the GDDR/DDR memory storage. The memory system implements a training mode feature that enables and disables logic within the circuit configured to place the memory system into either a training mode or an operational mode, and connects/disconnects the receivers to a processing component that governs the training operations.

Disclosed herein are methods and systems designed to address the unique requirements of high-speed memory systems (e.g., GDDR and DDR) by providing a hardware-based receiver eye scan approach to obtain optimal DFE coefficients for operation. For example, in single-ended applications, such as GDDR or DDR, the DFE is realized by changing the reference voltage (VREF), otherwise referred to as the DFE coefficient, against which the incoming data signal is compared. A system that can prevent over- or under-equalization to maintain an optimal voltage margin is necessary. For example, if the incoming bit pattern is 00, and the reference voltage VREF is lowered in an attempt to sensitize the system for a potential change in logic level, the system will favor 01 as the incoming bit pattern but will be unfavorable for 00 pattern. Training an optimal DFE coefficient can help prevent a system from over or under adjusting by setting a mid-range voltage to which the system can always return.

The embodiments described herein require less hardware than a conventional Least Mean Square (LMS) approach and do not require identifying an error receiver threshold, thereby preventing propagation of any error to the final DFE coefficient. The embodiments described herein are area efficient by repurposing existing hardware used in training mode during normal operation to prevent circuitry redundancies. The embodiments described herein include adapting the optimal decision threshold (e.g., nominal reference voltage) generated during nominal reference voltage training to train the DFE coefficient to determine an optimal DFE coefficient that will not under- or over-equalize data transmission. The optimal decision threshold, obtained as a pre-requisite to DFE training, is the optimal reference voltage level for the data eye scan without DFE. Any errors that may occur during nominal reference voltage training are not propagated during computation of the optimal DFE coefficient, thereby eliminating possible error residue. The embodiments described herein results in a greater eye opening of the GDDR/DDR system, which correlates to improved timing and voltage noise margins, thereby reducing package loss and PCB transmission loss.

In an embodiment, a method for DFE training in circuits comprises determining, by a register-transfer level (RTL) device, a first transition voltage value of a first expected bit pattern using a reference voltage, the first transition voltage value received from a receiver, wherein the first expected bit pattern is at least one of 00 or 11; determining, by the RTL device, a second transition voltage value of a second expected bit pattern using the reference voltage, the second transition voltage value received from the receiver, the second expected bit pattern having a same first bit as the first expected bit pattern, wherein the second expected bit pattern is at least one of 01 or 10; calculating, by the RTL device, an optimal reference voltage value by averaging the first transition voltage values of the first expected bit pattern and the second transition voltage value of the second expected bit pattern; and storing, by the RTL device, the optimal reference voltage value in a register corresponding to a logic value of the same first bit.

In another embodiment, a system configured to train a DFE coefficient comprises a receiver; a plurality of registers; and an RTL device, the RTL device configured to: determine a first transition voltage value of a first expected bit pattern using a reference voltage, the first transition voltage value received from the receiver, wherein the first expected bit pattern is at least one of 00 or 11; determine a second transition voltage value of the second expected bit pattern using the reference voltage, the second transition voltage received from the receiver, the second expected bit pattern having a same first bit as the first expected bit pattern, wherein the second expected bit pattern is at least one of 01 or 10; calculate an optimal reference voltage value by averaging the first transition voltage value of the first expected bit pattern and the second transition voltage value of the second expected bit pattern; and store the optimal reference voltage value at a register corresponding to a logic value of the same first bit.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Figure 1:
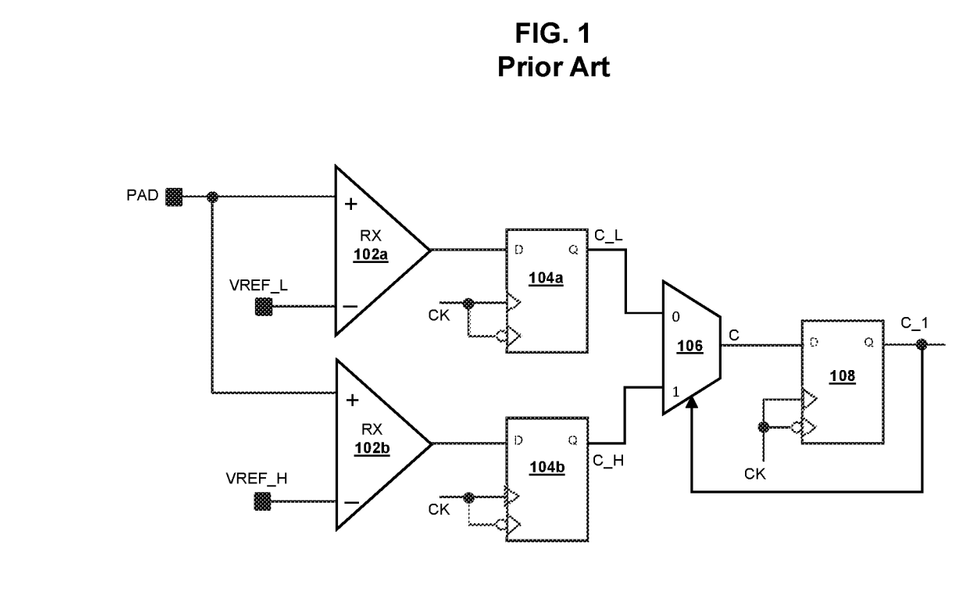
FIG. 1 is a schematic diagram illustrating a 1-Tap unrolled DFE application.

In previous solutions, such as a 1-Tap unrolled application illustrated in FIG. 1, if a previous bit of an incoming bit-stream received at a contact pad (PAD) is logic low (e.g., 0), the reference voltage for a present bit is decreased for easy detection of a logic high (e.g., 1). Similarly, if the previous bit in the incoming bit-stream is high, the reference voltage for the present bit is increased for easy detection of a logic low (e.g., 0). The 1-Tap unrolled DFE application that considers only the current bit and one previous bit is implemented by having two reference voltages, (VREF_L) and (VREF_H), one for each logic level. Reference voltage VREF_L is used if the previous bit in the incoming bit-stream is low (e.g., 0), and reference voltage VREF_H is used if the previous bit is high (e.g., 1). The voltage margin of such a system is equal to the voltage value received at PAD minus the reference voltage VREF_L (e.g., PAD−VREF_L) if the previous bit is 0 and the voltage value received at PAD minus the reference voltage VREF_H (e.g., PAD−VREF_H) if the previous bit is 1. Receiver 102$a$ receives reference voltage VREF_L, and, in conjunction with flip-flop 104$a$, outputs an output signal (C_L). Receiver 102$b$ receives reference voltage VREF_H and, in conjunction with flip-flop 104$b$, outputs an output signal (C_H). A multiplexer 106 determines which signal to output based on the previous bit in the incoming bit-stream. DFE training, such as that implemented by the embodiments described herein, can obtain optimal values of VREF_L and VREF_H to more accurately detect logic levels of incoming bit-streams without constantly altering the reference voltages during operation, thereby reducing the likelihood a transition will be misread.

A DFE training method may include an "eye scan first fail method." In the eye scan first fail method, a reference voltage (VREF_L) is the reference threshold for a present (current) bit whose previous bit is 0. Where the previous bit is 0, the current bit may be a 1 or a 0, so two bit pattern combinations for DFE purposes include 01 and 00. Decreasing the reference voltage VREF_L will improve a voltage margin for detecting a 01 bit pattern, but will reduce the voltage margin for detecting a 00 bit pattern. An optimal value of reference voltage VREF_L should maintain equal voltage margins for both 01 and 00 bit pattern. To determine the optimal value, a DFE algorithm detects 01 and 00 bit pattern in the incoming bit stream, and obtains a minimum voltage level at the center of the eye width scan for the 01 bit pattern (e.g., a minimum 01 transition voltage) and a maximum voltage level at the center of the eye width scan for the 00 bit pattern (e.g., a maximum 00 transition voltage). The DFE algorithm calculates a statistical metric (e.g., average, mean) of these two values to be the optimal value for the reference threshold of VREF_L. A processor may execute the training method multiple times and calculate a running average of the optimal value.

Another DFE training method may be an "eye scan average method." The eye scan average method operates largely the same as the eye scan first fail method, except that the DFE algorithm determines an average voltage level for each bit pattern (e.g., an average for the 01 bit pattern and an average for the 00 bit pattern), rather than averaging minimum and maximum voltage levels. This method is effective for data eye openings with similar eye height reduction for "01" and "00" patterns, which is true for most data eye openings. It also requires less downtime of the system upon startup for DFE training than the eye scan first fail method, which requires multiple executions. The eye scan average method is often preferable, and will be described in detail with reference to the figures.

Prior to DFE training, a nominal reference voltage training and a clock phase training take place to set initial values of reference voltages VREF_L and VREF_H equal to a nominal reference voltage and align a clock phase of a sampling clock with an open center of an eye width scan of a first receiver and second receiver. For the purpose of this disclosure, the nominal reference voltage is assumed 1000 mV, but is not limited as such.

Figure 2:
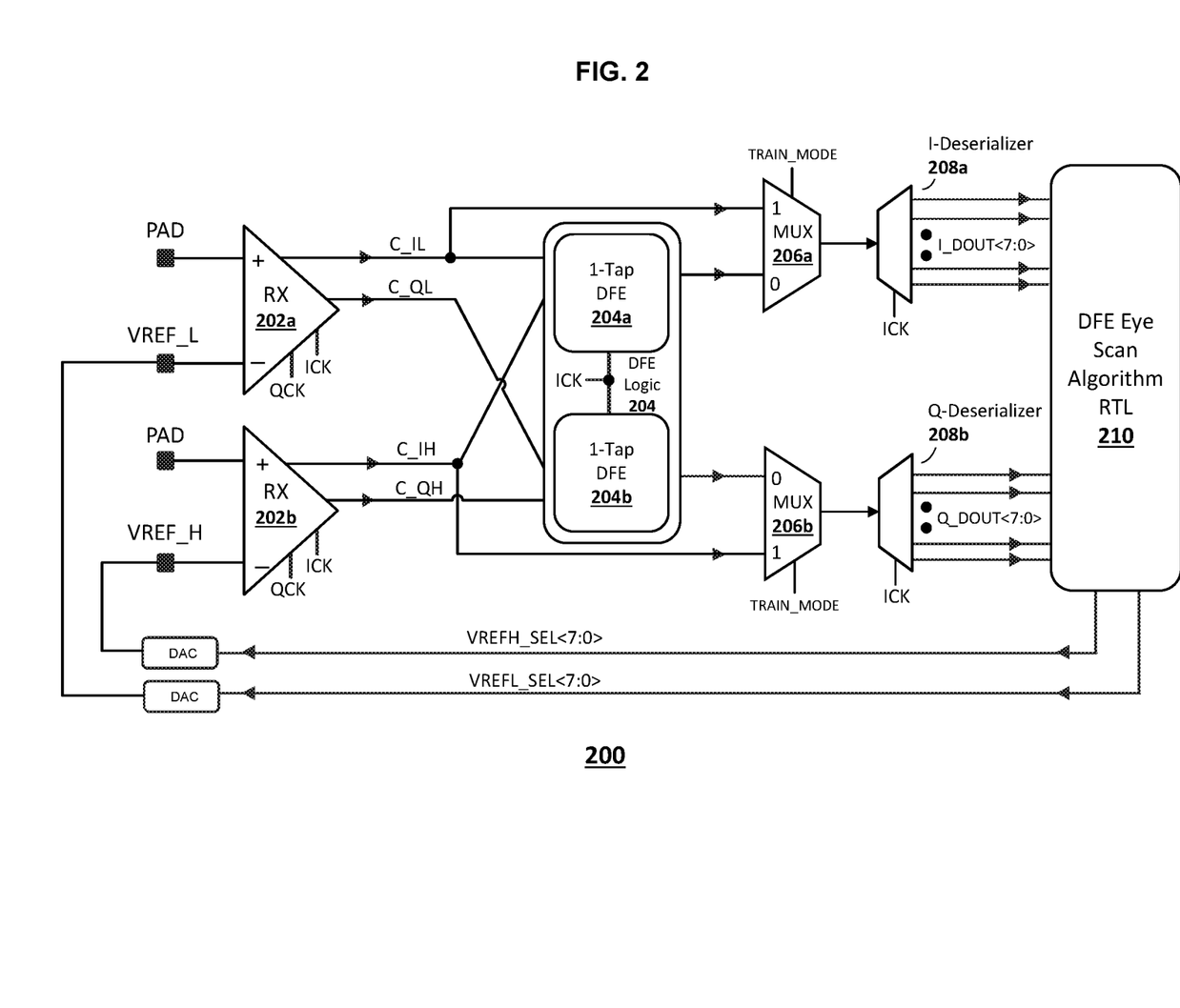
FIG. 2 is a schematic diagram illustrating an exemplary implementation of a DFE training scheme, according to an embodiment.

FIG. 2 is a schematic diagram illustrating a circuit 200, according to an embodiment. Circuit 200 is configured to train a DFE coefficient, which may include a first receiver 202a (sometimes referred to as a "reference bit-stream receiver 202a") configured to determine the reference bit pattern using a first reference voltage value set to a nominal reference voltage value. The circuit 200 may further include a second receiver 202b (sometimes referred to as an "error receiver 202b") configured to receive a second reference voltage value, which will be swept to find the transition voltage values of 00, 01, 10 and 11 patterns.

The illustrative circuit 200 comprises an RTL processor 210 that is coupled to the second receiver 202b. Although the RTL processor 210 is described as being a processor for the purpose of this disclosure, it should be appreciated that the RTL processor 210 may include any circuit-level logic device (e.g., one or more registers, one or more processors, one or more logic gates) capable of performing the various data processing tasks and operations described herein. In operation, the RTL processor 210 is configured to determine a transition voltage value of the first expected bit pattern (for instance 00) and a transition voltage value of the second expected bit pattern (for instance 01), then calculates an optimal reference voltage value by averaging the transition voltage values of the first expected bit pattern and the second expected bit pattern. The RTL processor 210 then stores the optimal reference voltage value at a register (or any other storage or logic medium), where the optimal reference voltage value corresponds to a logic value of the same first bit (for instance 0).

The RTL processor 210 is further configured to perform an eye scan algorithm, such that the circuit 200 is capable of executing, for example, an eye scan average method as described herein. Additionally or alternatively, the circuit 200 may be configured to execute, for example, an eye scan first fail method with circuit 200.

In addition to RTL processor 210, the circuit 200 includes a first receiver 202a, a second receiver 202b, a DFE logic block 204, a first multiplexer 206a, a second multiplexer 206b, an I-deserializer 208a, and a Q-deserializer 208b. During DFE training, a TRAIN_MODE variable is set to 1, which causes output data C_IL from first receiver 202a and output data C_IH from second receiver 202b to bypass DFE logic block 204 and be input at first multiplexer 206a and second multiplexer 206b, respectively. Output data C_IL is deserialized at I-deserializer 208a, received at RTL processor 210, and outputs the data to a register I_DOUT<7:0>. Likewise, output data C_IH is deserialized at Q-deserializer 208b, received at RTL processor 210, and output the data to a register Q_DOUT<7:0>.

Reference bit-stream receiver 202a receives a first expected bit pattern as incoming data from a contact pad PAD, a first input reference voltage VREF_L, and two clock inputs: an in-phase clock ICK and a quadrate clock QCK. The first input reference voltage VREF_L is initially set to a nominal voltage 1000 mV and stored as VREFL_SEL<7:0> by RTL processor 210. The use of both the in-phase clock and the quadrate clock occurs often in high-speed application for clock phase recovery to place an in-phase clock edge ICK at a center of read data eye.

In some embodiments, reference bit-stream receiver 202a determines the first expected bit pattern by determining that a transition occurs by measuring incoming voltage against the nominal voltage value stored in VREFL_SEL<7:0> and outputting logic high or logic low accordingly. As such, VREFL_SEL<7:0> remains at the nominal voltage during DFE training. Reference bit-stream receiver 202a outputs the expected bit pattern as output data C_IL to the RTL processor 210 via multiplexer 206a as I_DOUT<7:0>.

Error receiver 202b may receive the first expected bit pattern from the contact pad PAD, the in-phase clock ICK, the quadrate clock QCK, and a second input reference voltage VREF_H. Error receiver 202b determines the first expected bit pattern using second reference voltage VREF_H, and outputs the output data C_IH to the RTL processor 210 via multiplexer 206b as Q_DOUT<7:0>.

Second reference voltage VREF_H may be variable and initially equal to the nominal voltage value. In such cases, the transition voltage value of the first expected bit pattern is equal to the second reference voltage value at which a number of logic high bits is equal to a number of logic low bits. Determining the transition voltage may include the second receiver comparing the first expected bit pattern to the second reference voltage value to determine a number of logic low bits and a number of logic high bits in the pattern. Responsive to determining the number of logic high bits is higher than the number of logic low bits, the RTL processor 210 may increase the second reference voltage value, and responsive to determining the number of logic low bits is higher than a number of logic high bits, the RTL processor 210 may decrease the second reference voltage value.

For example, the RTL processor 210 checks Q_DOUT<7:0>, and determines whether a number of logic low bits is greater than a number of logic high bits. If yes, the RTL processor 210 decreases the value of reference voltage VREF_H; if no, the RTL processor 210 increases second reference voltage VREF_H and stores the new VREF_H as VREFH_SEL<7:0>. RTL processor 210 outputs VREFH_SEL<7:0> to error receiver 202b via a digital-to-analog converter, and continues the process until determining a value of VREFH_SEL<7:0> where the number of logic low bits is equal to the number of logic high bits (e.g., a first transition voltage). The RTL processor 210 then stores the first transition voltage value stored as VREFH_SEL<7:0> in a register associated with the first expected bit pattern. For example, the RTL processor 210 may store the value of VREFH_SEL<7:0> for bit pattern 00 in a register VREFL1, for bit pattern 01 in a register VREFL2, for bit pattern 11 in a register VREFH1, and for bit pattern 10 in a register VREFH2 (not pictured). The above-described process occurs for each possible bit pattern 00, 01, 11, and 10.

In some embodiments, a second expected bit pattern is analyzed in a manner similar to the first expected bit pattern. The second expected bit pattern is a bit pattern that shares a same first bit with the first expected bit pattern, for example, 00 and 01 or 11 and 10. In some embodiments, the transition voltage value for the first bit pattern may be equal to an eye scan average voltage value of the first bit pattern, and the transition voltage value for a second bit pattern may be equal to an eye scan average voltage value of the second bit pattern. For example, determining an optimal DFE coefficient value for VREF_L or VREF_H includes the RTL processor 210 calculating an average of the first transition voltage value of the first bit pattern and a second transition voltage corresponding to a transition voltage of a second expected bit pattern.

The RTL processor 210 may be further configured to store the transition voltage value of the second expected bit pattern in a register associated with the second expected bit pattern. Thus, the first and second expected bit pattern are stored in registers VREFL1 and VREFL2 or in VREFH1 and VREFH2. Optimal reference voltage VREF_L is therefore an average of the transition voltage values stored in VREFL1 and VREFL2, and optimal reference voltage VREF_H is an average of the transition voltage values stored in VREFH1 and VREFH2. DFE training is complete only when both optimal DFE coefficients are calculated.

In some cases, the RTL processor 210 may output the optimal reference voltage value to the first receiver 202a as a first reference voltage value, in response to RTL processor 210 determining that the logic value of the same first bit is "low." For example, the RTL processor 210 outputs the optimal reference voltage VREF_L as VREFL_SEL<7:0> to a digital-to-analog converter, which outputs optimal reference voltage VREF_L to reference bit-stream receiver 202a. And in some cases, the RTL processor 210 may output the optimal reference voltage value to the second receiver 202b as the second reference voltage value, in response to RTL processor 210 determining that the logic value of the same first bit is "high." For example, the RTL processor 210 outputs the optimal reference voltage VREF_H as VREH_SEL<7:0> to a digital-to-analog converter, which outputs optimal reference voltage VREF_H to second receiver 202b as the second reference voltage value.

In some embodiments, such as embodiments that implement an eye scan first fail method, The transition voltage value for 01 and 11 pattern may be equal to an eye scan minimum voltage value and the transition voltage value for 00 and 10 pattern may be equal to an eye scan maximum voltage value. For example, the RTL processor 210 may determine, for each incoming bit pattern, a transition voltage obtained at a center of a data eye width scan at which the in-phase clock is centered. RTL processor 210 determines a maximum value for a 00 transition at the center of the data eye width scan, and stores the value in register VREFL1. RTL processor 210 determines a minimum value for a 01 transition at the center of the data eye width scan, and stores the value in register VREFL2. RTL processor 210 determines a minimum voltage level for 11 transition at the center of the data eye width scan, and stores the value in register VREFH1. RTL processor 210 determines a maximum voltage value for 10 transition at the center of the eye width scan, and stores the value in register VREFH2.

Similar to the eye scan average method, in the eye scan first fail method RTL processor 210 calculates an average of the values stored in VREFL1 and VREFL2 as optimal first reference value VREF_L, and an average of the values stored in VREFH1 and VREFH2 as optimal second reference value VREF_H. RTL processor 210 may execute the training method multiple times and calculate a running average over time of VREF_L and VREF_H, always outputting VREF_L as VREFL_SEL<7:0> and VREFH as VREFH_SEL<7:0> to the digital-to-analog converter for receipt by reference bit-stream receiver 202a and error receiver 202b, respectively.

Upon completion of DFE training, the TRAIN_MODE variable is set to 0, and normal read operation commences (e.g., DFE logic block 204 is not bypassed). This results in reference bit-stream receiver 202a outputting an output data signal C_IL and C_QL to DFE logic block 204, and error receiver 202b outputting an output data signal C_IH and C_QH to DFE logic block 204. DFE logic block 204 includes a first DFE logic block 204a and a second DFE logic block 204b. First logic block 204a and second logic block 204b include logic similar to that described in FIG. 1, but do not include receiver 102a and receiver 102b. Instead, receivers 202a and 202b are repurposed from the DFE training stage, and generate two output data signals each using the two clock signals ICK and QCK, such that each logic block receives a low data output signal (C_IL or C_QL) and a high data output signal (C_IH or C_QH). This configuration eliminates the need for additional receivers in the circuit to generate the four output data signals. The first DFE logic block 204a receives all I samples (e.g., C_IL and C_IH), and the second DFE logic block 204b receives all Q samples (e.g., C_QL and C_QH). This allows the system to continue implementing DFE during operation to alter which receiver output is chosen based on the previous bit received in the bit pattern. During normal read operation, the RTL processor 210 updates the trained values stored in register VREFL_SEL<7:0> and register VREFH_SEL<7:0>, which are passed back to reference voltage inputs of reference bit-stream receiver 202a and error receiver 202b, respectively.

Referring now to FIGS. 3-6, several methods for training a DFE coefficient for possible bit patterns will be described. FIGS. 3-6 illustrate a flow chart outlining the DFE training scheme implemented by the circuit of FIG. 2 for each bit pattern. The illustrative embodiments shown in FIGS. 3-6 occur immediately after startup and clock phase training, but such implementations are not always required in order to fall within the scope of this disclosure.

Figure 3:
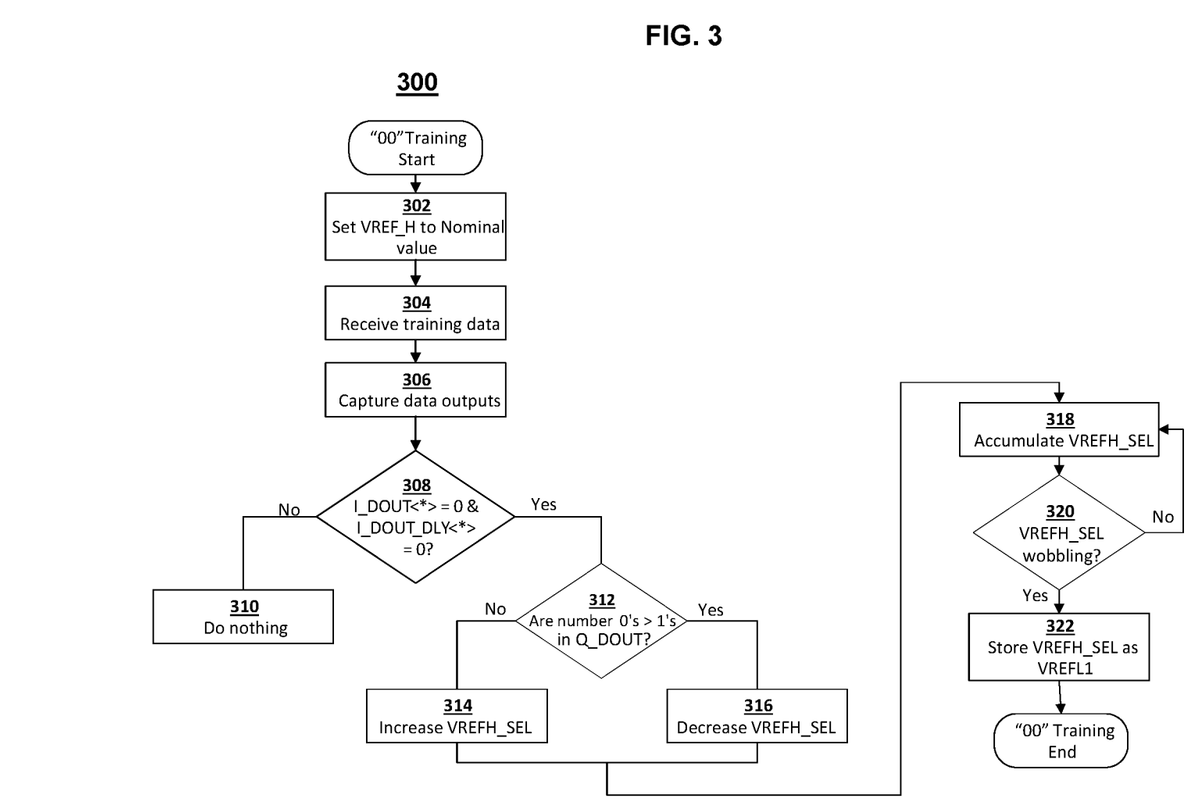
FIG. 3 is a block diagram illustrating a training scheme flowchart for training a DFE coefficient for bit pattern 00, according to an embodiment.

FIG. 3 illustrates a method 300 for training a DFE coefficient for all 00 transitions in a bit-stream as executed by the circuit 200 described with reference to FIG. 2. Step 302 may include setting a value of VREF_H equal to a nominal voltage value at an RTL processor using temporary variable, VREFH_SEL, like that described with reference to FIG. 2. The RTL processor may determine the nominal reference voltage upon startup using nominal reference voltage training. Step 304 includes receiving training data at a contact pad of a receiver, which outputs the received data to the RTL processor. The RTL processor then may execute a step 306, during which the RTL processor determines and captures data output by the receiver as I_DOUT and Q_DOUT, similarly to that described with reference to FIG. 2. During step 308, the RTL processor determines whether the bit pattern is 00 from the training data. If the bit pattern is 00, the method 300 proceeds to a step 312. If the bit pattern is not 00, the method 300 proceeds to a step 310, and the RTL processor does nothing and terminates the process.

At step 312, the RTL processor determines whether a number of logic low bits is greater than a number of logic high bits in the data Q_DOUT using VREFH_SEL. If step 312 determines the number of logic low bits is not greater than the number of logic high bits, the method proceeds to a step 314, which includes increasing the value of VREFH_SEL. If step 312 determines the number of logic low bits is greater than the number of logic high bits, the method proceeds to a step 316, which includes decreasing the value of VREFH_SEL. After increasing or decreasing the value of VREFH_SEL, the method 300 can proceed to a step 318. During step 318, the method accumulates VREFH_SEL, or, in other words, the method repeats steps 312-316 as necessary, and continues to incrementally increase or decrease the value of VREFH_SEL according to the determination of step 312. Step 320 checks whether the value of VREFH_SEL is wobbling (e.g., being increased then decreased about the same value); this occurs when the number of logic high bits of Q_DOUT is equal to the number of logic low bits. If step 320 determines the value of VREFH_SEL is not wobbling, the method 300 continues to execute steps 312-318 as necessary. If step 320 determines the value of VREFH_SEL is wobbling, the method 300 may proceed to a step 322. Step 322 includes storing the value of VREH_SEL in a register corresponding to bit pattern 00, in this case VREFL1, which ends the training process for bit pattern 00.

Figure 4:
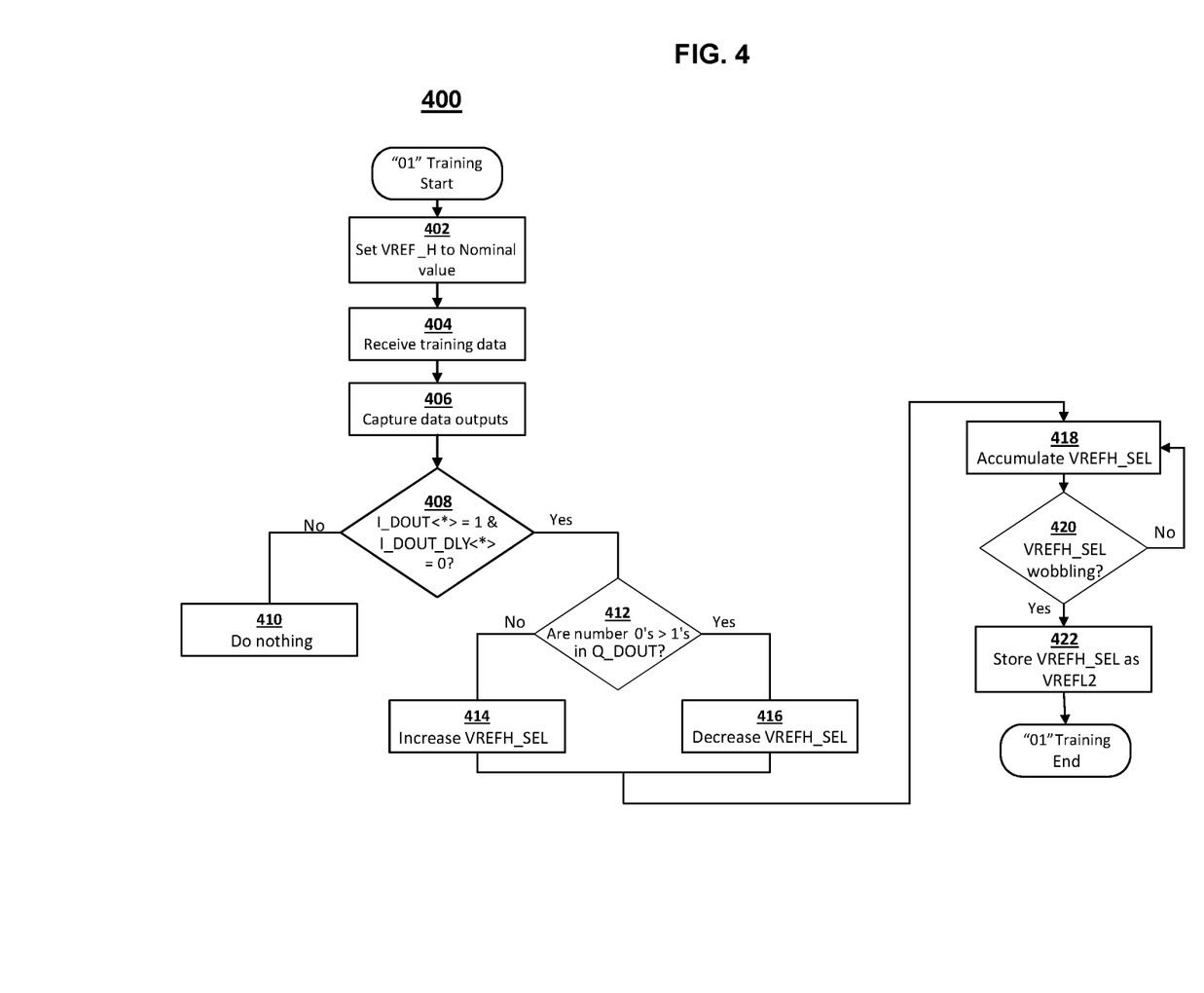
FIG. 4 is a block diagram illustrating a training scheme flowchart for training a DFE coefficient for bit pattern 01, according to an embodiment.
Figure 5:
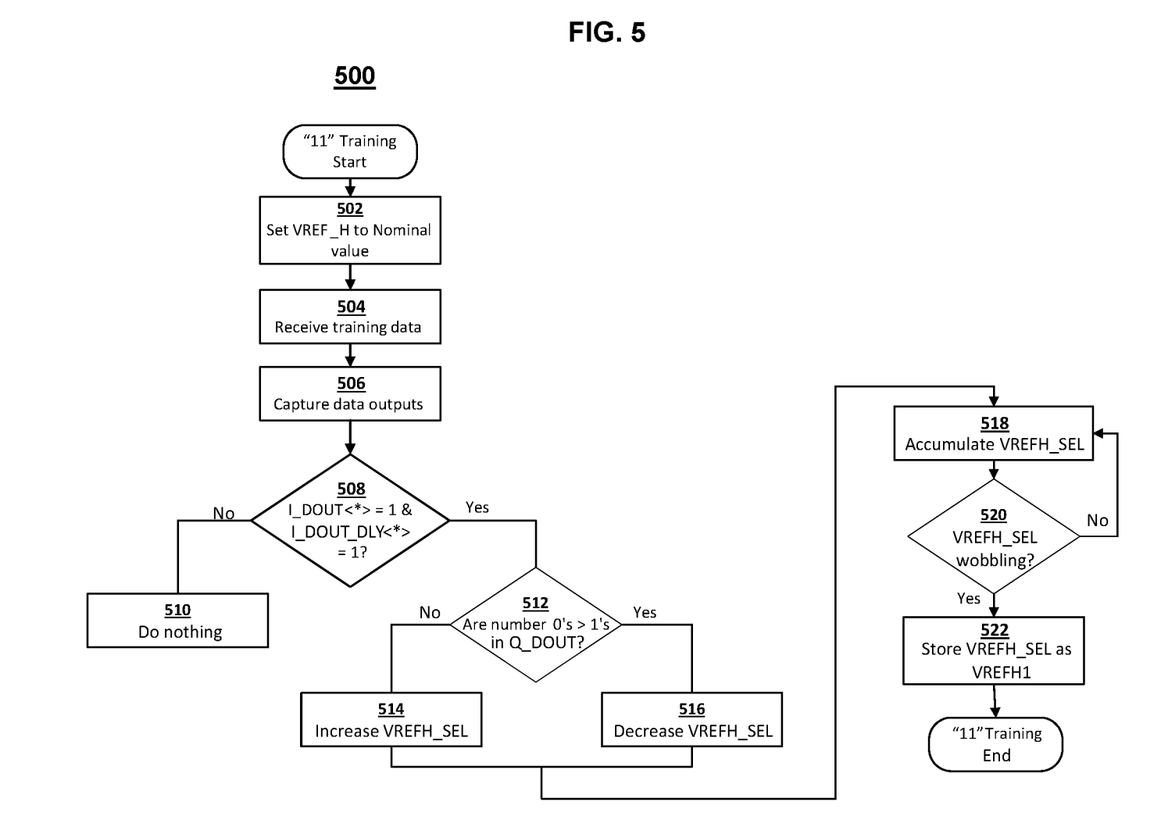
FIG. 5 is a block diagram illustrating a training scheme flowchart for training a DFE coefficient for bit pattern 11, according to an embodiment.
Figure 6:
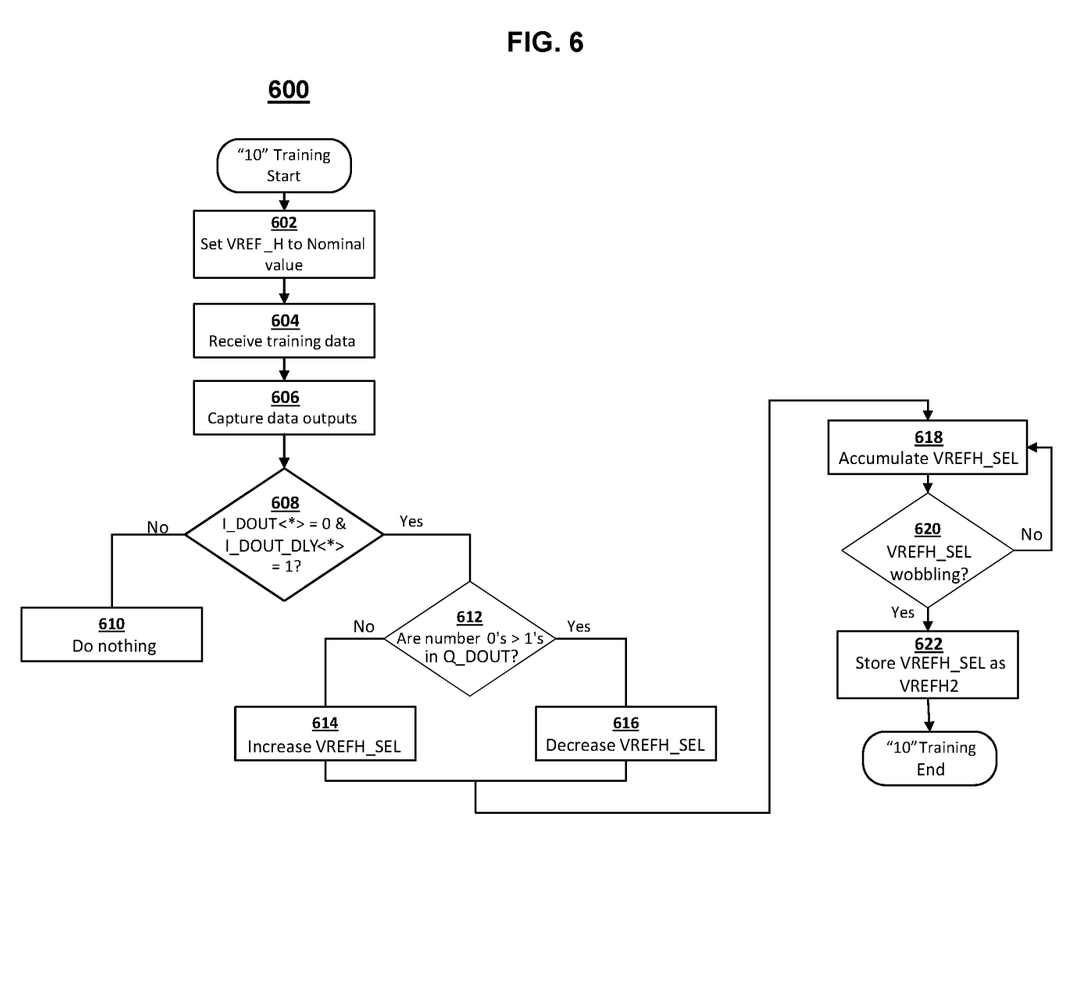
FIG. 6 is a block diagram illustrating a training scheme flowchart for training a DFE coefficient for bit pattern 10, according to an embodiment.

The methods described in FIGS. 4-6 are substantially similar to that of FIG. 3; as such, only differences between the figures will be described.

FIG. 4 illustrates a method 400 for training a DFE coefficient for all 01 transitions in a bit-stream. Steps 402-422 of method 400 may proceed similarly to steps 302-322 of method 300 described with reference to FIG. 3. However, two main differences occur: first, step 408 of method 400 includes determining by an RTL processor whether the bit pattern is 01, not 00, from the training data. If the bit pattern is 01, the method 400 proceeds to step 412. If the bit pattern is not 01, the method 400 proceeds to step 410, and the RTL processor does nothing and terminates the process. Second, step 422 of method 400 includes storing the value of VREH_SEL in a register corresponding to bit pattern 01, in this case VREFL2, which ends the training process for bit pattern 01.

FIG. 5 illustrates a method 500 for training a DFE coefficient for 11 transitions in a bit-stream. Steps 502-522 of method 500 may proceed similarly to steps 302-322 of method 300 described with reference to FIG. 3. However, two main differences occur: first, step 508 includes determining by an RTL processor whether the bit pattern is 11, not 00, from the training data; if the bit pattern is 11, the method proceeds to step 512. If the bit pattern is not 11, the method proceeds to step 510, and the RTL processor does nothing and terminates the process. Second, step 522 includes storing the value of VREH_SEL in a register corresponding to bit pattern 11, in this case VREFH1, which ends the training process for bit pattern 11.

FIG. 6 illustrates a method 600 for training a DFE coefficient for 10 transitions in a bit-stream. Steps 602-622 of method 600 may proceed similarly to steps 302-322 of method 300 described with reference to FIG. 3. However, two main differences occur: first, step 608 includes determining by an RTL processor whether the bit pattern is 10, not 00, from the training data; if the bit pattern is 10, the method proceeds to step 612. If the bit pattern is not 10, the method proceeds to step 610, and the RTL processor does nothing and terminates the process. Second, step 622 includes storing the value of VREH_SEL in a register corresponding to bit pattern 10, in this case VREFH2, which ends the training process for bit pattern 10.

In some embodiments, a method of training a DFE coefficient, such as that described with reference to FIG. 7, may include determining, by a first receiver, a first expected bit pattern using a first reference voltage value set to a nominal reference voltage value. The method may further include receiving, by a second receiver, a second reference voltage value and the first expected bit pattern. The method may further include determining, by an RTL processor coupled to the second receiver, a transition voltage value of the first expected bit pattern. The method may further include receiving, by the second receiver, the second reference voltage value and a second expected bit pattern, the second expected bit pattern having a same first bit as the first expected bit pattern. The method may further include determining, by the RTL processor, a transition voltage value of the second expected bit pattern. The method may further include calculating, by the RTL processor, an optimal reference voltage value by averaging the transition voltage values of the first expected bit pattern and the second-expected bit pattern. The method may further include storing, by the RTL processor, the optimal reference voltage value in a register corresponding to a logic value of the same first bit.

Figure 7:
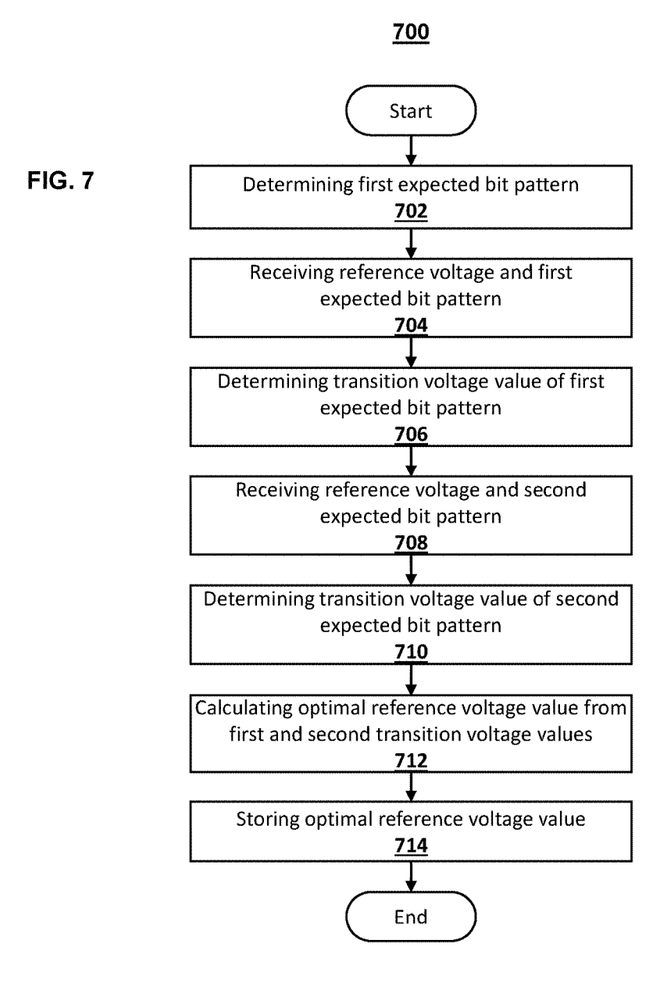
FIG. 7 is a block diagram illustrating a flowchart of a training method for a DFE in circuits according to an embodiment.

FIG. 7 illustrates an embodiment of a method 700 for training optimal DFE coefficients, and will be described. Method 700 may begin a step 702. Step 702 may include determining a first expected bit pattern, at a first receiver, for example, reference bit-stream receiver 202a described with reference to FIG. 2. Step 702 may include the first receiver receiving a first reference voltage and incoming data, and comparing the incoming data to the first reference voltage to determine the first expected bit pattern. In some embodiments, the first reference voltage may be a nominal reference voltage set in advance of method 700, and may have a value of 1000 mV. In some embodiments, the first expected bit pattern comprises two bits.

In some embodiments, step 704 can include receiving a second reference voltage and the first expected bit pattern determined in step 702 at a second receiver, such as error receiver 202b described with reference to FIG. 2. The second reference voltage can be varied during DFE training, and may initially be equal to the nominal reference voltage value of step 702. Step 706 includes determining a transition voltage value of the first expected bit pattern (e.g., 00) by an RTL device, such as RTL processor 210 described with reference to FIG. 2.

In some embodiments, the RTL device determines the transition voltage value of the first expected bit pattern during step 706. The transition voltage value of the first expected bit pattern is equal to the second reference voltage value at which a number of logic high bits is equal to a number of logic low bits. This value is determined by comparing the first bit pattern to the second reference voltage value to determine a number of logic low bits and a number of logic high bits in the pattern. If the RTL device determines the number of logic high bits is higher than the number of logic low bits, step 706 may include increasing the second reference voltage value. If the RTL device determines the number of logic low bits is higher than a number of logic high bits, step 706 may include decreasing the second reference voltage value. Step 706 may encompass altering the second reference voltage value according to steps 312-318 of method 300 described with reference to FIG. 3. Step 706 may include storing, by the RTL device, the transition voltage value of the first expected bit pattern in a register associated with the first expected bit pattern, such as VREFL1 or VREFH1 described with reference to FIG. 2.

Step 708 includes receiving the second reference voltage and a second expected bit pattern at the second receiver described in step 704. In some embodiments, the first bit pattern and the second expected bit pattern share a same first bit; thus, if the first bit pattern is 00, the second bit pattern is 01. Alternatively, if the first bit pattern is 11, the second bit pattern is 10. It will be appreciated that the first bit pattern may also be bit pattern 01 or 10, with the second bit pattern being 00 and 11 in such a case, respectively.

Step 710 includes determining a transition voltage value of the second expected bit pattern by the RTL processor in a manner similar to that described with reference to step 706. In some embodiments, step 710 may further include storing, by the RTL device, the transition voltage value of the second expected bit pattern in the register associated with the second bit pattern of registers VREFL2 or VREFH2; illustrative examples of such registers are described with reference to FIG. 2.

Step 712 includes calculating an optimal reference voltage value (e.g., the optimal DFE coefficient) from the transition voltage value of the first expected bit pattern and the transition voltage value of the second expected bit pattern by the RTL processor. The RTL processor may calculate the optimal reference voltage value by averaging the transition voltage values together to obtain an average transition voltage. For example, step 712 can include averaging the values stored in registers VREFL1 and VREFL2 together to obtain an optimal reference voltage value for bit pattern with a first bit of logic low. Step 712 can include averaging the values stored in registers VREFH1 and VREFH2 together to obtain an optimal reference voltage value for bit pattern with a first bit of logic high.

Step 714 may include storing the calculated optimal reference voltage value in a register associated with the same first bit of the first expected bit pattern and the second expected bit pattern. For example, if the same first bit is logic low, step 714 may include storing the optimal reference voltage value in a register VREFL_SEL<7:0>, as described with reference to FIG. 2. Is the same first bit is logic high, step 714 may include storing the optimal reference voltage value in a register VREFH_SEL<7:0>, as described with reference to FIG. 2.

In some embodiments, step 714 may further include outputting the optimal reference value to either the first receiver or the second receiver based upon a logic value of the first bit. For example, step 714 may include, responsive to determining that the logic value of the same first bit is low, outputting the optimal reference voltage stored in VREFL_SEL<7:0> by the RTL device to the first receiver as an optimal first reference voltage value VREF_L. Step 714 may also include, responsive to determining that the logic value of the same first bit is high, outputting the optimal reference voltage stored in VREFH_SEL<7:0> by the RTL device to the second receiver as an optimal second reference voltage VREF_H. In the eye scan average method, the RTL device may execute method 700 twice to obtain both a VREF_L value and a VREF_H value.

In an alternative embodiment of method 700, such as the eye scan first fail method, step 706 may include determining a logic value of a second bit of the first and second bit patterns. For example, in step 706, the RTL processor may determine that the logic value of the second bit of the first and second bit patterns is low (i.e., first bit pattern is 00 and second bit pattern is 10). In such an embodiment, step 710 may include storing the maximum transition voltage value in register VREFL1 for the 00 pattern, and the maximum transition voltage value in register VREFH2 for the 10 pattern. In such a case where step 706 determines that the first bit pattern is 11 and the second bit pattern is 01, step 710 may include storing the minimum transition voltage value for the 11 bit pattern in register VREFH1 and the minimum transition voltage value for the 01 bit pattern in register VREFL2. In the alternative embodiment (e.g., the eye scan first fail method), steps 712 and 714 would still calculate both the average value of VREFL1 and VREFL2 and store the value in register VREFL_SEL<7:0>, and the average value of VREFH1 and VREFH2 and store the value in register VREFH_SEL<7:0>. In the alternative embodiment, method 700 may further repeat multiple times and store each optimal voltage transition value, and the RTL device may re-calculate the optimal transition voltage value as a running average after each run.

After training, when the memory system enters into an operational mode, the memory system is able to use stable optimal reference voltage values (e.g., DFE coefficients determined during training method 700) to consistently and properly identify voltage transitions (representing bit logic transitions) in an incoming analog signal. During operational mode, the memory system can now accurately convert the incoming analog signals to digital signals, where the digital signals include bits identified using the established optimal reference voltage values.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for decision feedback equalization training in circuits, the method comprising:
    determining, by a register-transfer level (RTL) device, a first transition voltage value of a first expected bit pattern using a reference voltage, the first transition voltage value received from a receiver, wherein the first expected bit pattern is at least one of 00 or 11;
    determining, by the RTL device, a second transition voltage value of a second expected bit pattern using the reference voltage, the second transition voltage value received from the receiver, the second expected bit pattern having a same first bit as the first expected bit pattern, wherein the second expected bit pattern is at least one of 01 or 10;
    calculating, by the RTL device, an optimal reference voltage value by averaging the first transition voltage value of the first expected bit pattern and the second transition voltage value of the second expected bit pattern; and
    storing, by the RTL device, the optimal reference voltage value in a register corresponding to a logic value of the same first bit.

2. The method of claim 1, further comprising:
    storing, by the RTL device, the first transition voltage value of the first expected bit pattern in a second register associated with the first expected bit pattern; and
    storing, by the RTL device, the second transition voltage value of the second expected bit pattern in a third register associated with the second expected bit pattern.

3. The method of claim 1, wherein responsive to determining that the logic value of the same first bit is low, outputting, by the RTL device, the optimal reference voltage as a first reference voltage value.

4. The method of claim 1, wherein responsive to determining that the logic value of the same first bit is high, outputting, by the RTL device, the optimal reference voltage as a second reference voltage value.

5. The method of claim 1, wherein the first and second expected bit patterns comprise two bits.

6. The method of claim 1, wherein the reference voltage value is variable, and the transition voltage value of the first or second expected bit pattern is equal to the reference voltage value at which a number of logic high bits is equal to a number of logic low bits.

7. The method of claim 1, wherein the reference voltage value is variable, and determining the first transition voltage value of the first expected bit pattern or the second transition voltage value of the second expected bit pattern comprises:
    comparing the first or second expected bit pattern to the reference voltage value to determine a number of logic low bits and a number of logic high bits in the first or second expected bit pattern;
    responsive to determining the number of logic high bits is higher than the number of logic low bits, increasing the reference voltage value; and
    responsive to determining the number of logic low bits is higher than the number of logic high bits, decreasing the reference voltage value.

8. The method of claim 1, wherein determining the first or second transition voltage value comprises:
    determining that a second bit of the first expected bit pattern and the second expected bit pattern has a logic value of high;
    setting the first transition voltage value equal to an eye scan minimum voltage value for the first expected bit pattern based on the second bit; and
    setting the second transition voltage value equal to an eye scan minimum voltage value for the second expected bit pattern based on the second bit.

9. The method of claim 1, wherein determining the first or second transition voltage value comprises:
    determining that a second bit of the first expected bit pattern and the second expected bit pattern has a logic value of low;
    setting the first transition voltage value equal to an eye scan maximum voltage value for the first expected bit pattern based on the second bit; and
    setting the second transition voltage value equal to an eye scan maximum voltage value for the second expected bit pattern based on the second bit.

10. The method of claim 1, wherein determining the first or second transition voltage value of the first or second expected bit pattern comprises determining a first average voltage value of the first expected bit pattern and a second average voltage value of the second expected bit pattern.

11. A system comprising:
    a receiver;
    a plurality of registers; and
    a register-transfer level (RTL) device configured to:
        determine a first transition voltage value of a first expected bit pattern using a reference voltage, the first transition voltage value received from the receiver, wherein the first expected bit pattern is at least one of 00 or 11;
        determine a second transition voltage value of a second expected bit pattern using the reference voltage, the second transition voltage value received from the receiver, the second expected bit pattern having a same first bit as the first expected bit pattern, wherein the second expected bit pattern is at least one of 01 or 10;
        calculate an optimal reference voltage value by averaging the first transition voltage value of the first expected bit pattern and the second transition voltage value of the second-expected bit pattern; and
        store the optimal reference voltage value at a register corresponding to a logic value of the same first bit.

12. The system of claim 11, wherein the RTL device is further configured to:

store at a first register corresponding to the first expected bit pattern, the first transition voltage value of the first expected bit pattern; and store at a second register corresponding to the second expected bit pattern, the second transition voltage value of the second expected bit pattern.

13. The system of claim 11, wherein responsive to determining that the logic value of the same first bit is low, the RTL device is configured to output the optimal reference voltage value as a first reference voltage value.

14. The system of claim 11, wherein responsive to determining that the logic value of the same first bit is high, the RTL device is configured to output the optimal reference voltage value as a second reference voltage value.

15. The system of claim 11, wherein the first and second expected bit patterns comprise two bits.

16. The system of claim 11, wherein the reference voltage value is variable, and the transition voltage value of the first or second expected bit pattern is equal to the reference voltage value at which a number of logic high bits is equal to a number of logic low bits.

17. The system of claim 11, wherein the reference voltage is variable, and the receiver is further configured to compare the first or second expected bit pattern to the reference voltage value to determine a number of logic low bits and a number of logic high bits in the first or second expected bit pattern; and responsive to determining the number of logic high bits is higher than the number of logic low bits, the RTL device is configured to increase the reference voltage value; and responsive to determining the number of logic low bits is higher than the number of logic high bits, the RTL device is configured to decrease the reference voltage value.

18. The system of claim 11, wherein the RTL device, responsive to determining that a second bit of the first expected bit pattern and the second expected bit pattern has a logic value of high, is further configured to:

set the first transition voltage value equal to an eye scan minimum voltage value for the first expected bit pattern based on the second bit, and set the second transition voltage value equal to an eye scan minimum voltage value for the second expected bit pattern based on the second bit.

19. The system of claim 11, wherein the RTL device, responsive to determining that a second bit of the first expected bit pattern and the second expected bit pattern has a logic value of low, is further configured to:

set the first transition voltage value equal to an eye scan maximum voltage value for the first expected bit pattern based on the second bit; and set the second transition voltage value equal to an eye scan maximum voltage value for the second expected bit pattern based on the second bit.

20. The system of claim 11, wherein the first transition voltage value for the first expected bit pattern is equal to a first eye scan average voltage value of the first expected bit pattern, and the second transition voltage value for the second expected bit pattern is equal to a second eye scan average voltage value of the second expected bit pattern.

* * * * *